Patented Jan. 25, 1944

2,339,818

UNITED STATES PATENT OFFICE 2,339,818

TERPENE DERIVATIVES

Alfred L. Rummelsburg, Wilmington, Del., assignor to Hercules Powder Company, Wilmington, Del., a corporation of Delaware No Drawing. Application May 31, 1941,
Serial No. 396,216

11 Claims. (Cl. 260—617)

This invention relates to a new series of terpene derivatives and more particularly to a new series of terpene derivatives resulting from the hydrogenation of condensation products of acyclic terpenes having three double bonds per molecule and crotonaldehyde. It also relates to a method for the preparation of these derivatives.

By the method in accordance with this invention, a condensation product of an acyclic terpene having three double bonds per molecule and crotonaldehyde is reacted with hydrogen. In this manner there is obtained a cyclic, primary alcohol which may or may not be saturated depending upon the conditions under which the hydrogenation reaction is carried out.

In accordance with this invention, there will first be prepared a condensation product of crotonaldehyde and an acyclic terpene having three double bonds per molecule, as for example, allo-ocimene, ocimene, myrcene, etc. Preferably, allo-ocimene will be employed inasmuch as this compound, in addition to having three double bonds per molecule, has them in a triply conjugated system. Hereinafter, in this specification an acyclic terpene having three double bonds per molecule will be referred to for convenience as merely an acyclic terpene.

Acyclic terpenes form addition products with crotonaldehyde by a Diels-Alder reaction to give well-defined compounds. These addition products are unsaturated, cyclic aldehydes and are obtained in as high as 70% yields by heating the acyclic terpene with an excess of crotonaldehyde at an elevated temperature for several hours. In the reaction which takes place, one molecule of the acyclic terpene may react with one molecule of crotonaldehyde or two molecules of the former may react with one of the latter, or vice versa. The extent to which each of these reactions takes place will depend upon the relative proportions of the reactants and the conditions of reaction. Furthermore, during this condensation any of the above compounds or the reactants may polymerize. The compound which will greatly predominate in the mixture, however, will be that formed when one molecule of acyclic terpene condenses with one molecule of crotonaldehyde, particularly so when the latter is used in slight excess. This same compound can, if desired, be separated from the other constituents by vacuum distillation, or the crude condensate may be reduced as such.

As an example of this condensation reaction, approximately equi-molar proportions of allo-ocimene and crotonaldehyde may be heated together at 200° C. for say 2.5 hours. The compound representing the combination of equimolar proportions of the reactants may be separated and will be found to be a fairly viscous, yellowish liquid having the following average characteristics:

B. P. (3 mm.) _____°C____ 117–119
$n_d^{17}$_____ 1.4952
$d_o^{17}$_____ 0.9256

It is this compound which is contemplated wherever, hereinafter, use is made of "the allo-ocimene-crotonaldehyde condensate." It may be otherwise referred to as trimethyl-butenyl-tetrahydrobenzaldehyde. However, if desired, the crude condensate may itself be employed in the processes of the invention, as may any of the compounds separable therefrom.

To form a cyclic, primary alcohol, then, in accordance with my invention, any of the aforesaid condensation products of acyclic terpenes with crotonaldehyde is reduced with hydrogen either with or without the use of a suitable hydrogenation catalyst. Preferably, the condensate resulting when equi-molar proportions of the reactants combine will be employed. It is, however, preferable to use a catalyst inasmuch as greater selectivity is thereby obtainable. It is possible by the use of particular catalysts to hydrogenate only the aldehyde group of the condensate molecule. The product, where "the allo-ocimene-crotonaldehyde condensate" has been employed, is a substitution product of tetrahydrobenzyl alcohol; and more particularly, it is trimethyl butenyl tetrahydrobenzyl alcohol. On the other hand, certain catalysts, in conjunction with the use of relatively high conditions of temperature and pressure, lead to the hydrogenation of the ethylenic double bonds of the molecule as well as the aldehyde group. In this instance, where "the allo-ocimene-crotonaldehyde condensate" has been employed, the product is a substitution product of hexahydrobenzyl alcohol; and more particularly, it is trimethyl butyl hexahydrobenzyl alcohol.

Without regard to selectivity the operable catalysts which may be used include the base metal catalysts, such as, active nickel, Raney nickel, etc., catalysts, the noble metal catalysts, such as, active platinum, palladium, rhodium, asmium, iridium and ruthenium, also active copper chromite catalyst. The quantity of catalyst, if used, may vary up to about 10% of the weight of the acyclic terpene-crotonaldehyde condensate, preferably up to about 5.0%. The foregoing catalysts may be used in unsupported form, or, if desired, supported on suitable inert support materials, such as, kieselguhr, diatomaceous earth, etc. The hydrogenation is desirably carried out at temperatures ranging from about 25° C. to about 250° C., depending upon the catalyst, if any, and the degree of hydrogenation desired. The hydrogen pressure may range from about 15 lbs./sq. inch to about 3000 lbs./sq. inch, depending upon the catalyst and the degree of hydrogenation desired. Using active base metal or copper chromite catalysts the preferable pressure range is from about 250 to about 3000 lbs./sq. inch, and the preferable temperatures range from about 100° C. to about 200° C. Using active noble metal catalysts, the preferable pressure range is from about 15 lbs./sq. inch to about 100 lbs./sq. inch, and the preferable temperature range from about 25° C. to about 100° C. Hydrogenation is continued until the desired degree of absorption has occurred and may be carried out in a batchwise or continuous manner.

As hereinbefore described, by proper choice of conditions used in carrying out the hydrogenation reaction, either an unsaturated or a saturated alcohol may be obtained. Thus, when active copper chromite catalyst is used under conditions of temperature and pressure within the operable and preferred ranges for this catalyst as disclosed above, the aldehyde group is preferentially hydrogenated and an unsaturated alcohol results. On the other hand, the use of active noble or base metal catalysts, in particular, active nickel, platinum or palladium catalysts, under conditions of temperature and pressure within the operable and preferred ranges for these catalysts are previously given, results in hydrogenation of both the ethylenic double bonds and the aldehyde group and a saturated alcohol results. In between these two extremes varying degrees of selectivity may be obtained using varied conditions of temperature and pressure, and using other catalysts under varied conditions.

Following hydrogenation, the catalyst is removed in any desirable manner, preferably by means of filtration. The product may then, if desired, be purified by means of distillation, preferably vacuum distillation. In this way any polymeric alcohols may be separated from the lower boiling monomeric alcohols. These polymeric alcohols comprise products formed during the hydrogenation, particularly at high temperatures. For example, "the allo-ocimene-crotonaldehyde condensate" may polymerize, and the polymer may then react with hydrogen to form an alcohol. It is possible, too, that the monomeric alcohol may first form, followed by polymerization. The monomeric alcohols are liquids, whereas the polymeric alcohols are soft resins.

In addition, if, for example, an allo-ocimene-crotonaldehyde condensate, which does not consist entirely of "the allo-ocimene-crotonaldehyde condensate," is used in the hydrogenation, the alcohols formed upon the hydrogenation of the other types of condensates, hereinbefore described, may be separated from the alcohol formed from "the allo-ocimene-crotonaldehyde condensate" by vacuum distillation.

This process of vacuum distillation will enable in addition, the separation of any polymers of condensation products of acyclic terpenes and crotonaldehyde, which may have been present originally or which may have been formed during the hydrogenation. The probability is, however, that this polymerized condensate will ultimately be hydrogenated and be separated from the monomeric alcohols as a polymeric alcohol residue. Vacuum distillation is also effective in separating color bodies if they are present in the crude hydrogenation product.

If desired, a suitable solvent may be employed during the hydrogenation process. Such solvents may be polar or nonpolar in nature and may comprise saturated alcohols, such as, methanol, ethanol, propanol, butanol, etc.; ethers, such as, ethyl ether, isopropyl ether, dioxane, etc.; esters, such as, ethyl acetate, butyl acetate, etc.; saturated hydrocarbons, such as, gasoline, hexane, cyclohexane, petroleum ether, etc.; organic acids, such as, acetic acid, propionic acid, butyric acid, etc., etc. If an organic acid is employed as the solvent, it is preferable to use it in conjunction with noble metal catalysts. The solvent may be removed following separation of the catalyst, by means of distillation, preferably in vacuo.

As an alternative procedure in accordance with the instant invention, "the allo-ocimene-crotonaldehyde condensate," or any of the other acyclic terpene-crotonaldehyde condensates, may be hydrogenated by means of nascent hydrogen. In general, this method is less satisfactory than that of catalytic hydrogenation. Reducing agents which may be employed when nascent hydrogen is employed include sodium amalgum-dilute acid, zinc dust-glacial acetic acid, sodium and ethyl alcohol, etc., using temperatures of from 40° C. to 150° C. In general, these reducing agents are selective for the aldehyde group, the ethylenic double bonds remaining substantially unhydrogenated.

The purified monomeric saturated alcohol resulting from the hydrogenation of "the allo-ocimene-crotonaldehyde condensate" has been found to have the following characteristics:

| | |
|---|---|
| Per cent OH | 8 |
| $n_d$ 20° C | 1.481 |
| Sp. gr. 20°/4° | 0.918 |
| B. P. (20 mm. pressure) ° C | 120–130+ |

The wide boiling range exhibited is probably due to the presence of various isomeric forms of the alcohol in the product. The distillate obtained is nearly colorless. In comparison with the above, the purified monomeric unsaturated alcohol resulting from the hydrogenation of only the aldehyde group of "the allo-ocimene-crotonaldehyde condensate" has been found to have a boiling point within the range of from 129 to 140° C. at 3 to 5 mm. pressure.

The material remaining after the monomeric constituents have been removed consists of polymeric alcohols. They are viscous resins and boil at about 170° C. to 250° C. at 3 mm. pressure. The extent to which these polymeric constituents will be present, will vary from about 5% to about 30%, depending upon the hydrogenation conditions and also the amount of polymeric condensate present in the original condensate. In general, the higher the hydrogenation temperature, the higher will be the content of polymeric alcohols in the reaction product.

The method in accordance with this invention will be further illustrated by the examples which follow. All parts and percentages are by weight unless otherwise specified.

*Example 1*

An allo-ocimene-crotonaldehyde condensate from which the polymeric constituents formed in the condensation had been removed was substantially completely hydrogenated to produce primary saturated alcohols as follows. 120 parts of condensate and 25 parts of methanol wet powdered Raney nickel catalyst were placed in a chrome-steel bomb. Hydrogen was introduced under pressure, the contents heated and agitated in accordance with the following schedule:

| Fraction | Pressure | Temp. | C | Mol wt. | OH | A. N. | $n_d^{20°C}$ | Sp. gr. 20°/4° | Wt. |
|---|---|---|---|---|---|---|---|---|---|
| | M m. | °C. | Percent | | Percent | | | | |
| 1 | 20 | 90 | | | 8.0 | | 1.4810 | 0.9188 | 4 |
| 2 | 20 | 120-170 | 78.8 | 198 | | | | | 114 |
| 3 | 20 | 170-190 | 78.0 | 212 | 9.1 | 2.5 | | | 12 |
| 4 | 1 | 150-200 | 76.0 | 263 | 9.8 | 5.0 | | | 30 |
| Residue | | | 77.4 | 450 | 6.2 | 3.5 | | | 15 |

Fraction No. 2 above distilled almost completely at 120–130° C. at 20 mm. pressure and was taken when the temperature suddenly rose to 170° C.

The following series of theoretical analyses

| Compound | C | H | OH | Mol. wt. | Mols combined crotonaldehyde | Mols allo-ocimene | No. |
|---|---|---|---|---|---|---|---|
| | Percent | Percent | Percent | | | | |
| $C_{13}H_{25}CH_2OH$ | 79.3 | 13.2 | 8.0 | 212 | 1 | 1 | 1 |
| $C_{16}H_{30}(CH_2OH)_2$ | 76.0 | 12.7 | 12.0 | 284 | 2 | 1 | 2 |
| $C_{23}H_{43}CH_2OH$ | 82.1 | 13.1 | 4.9 | 350 | 1 | 2 | 3 |
| $(C_{13}H_{25}CH_2OH)_2$ | 79.3 | 13.2 | 8.1 | 424 | 2 | 2 | 4 |
| $(C_{16}H_{30}CHOCH_2OH)_2$ | 76.0 | 12.7 | 6.0 | 568 | 4 | 2 | 5 |

| Time | Temp. | Pressure |
|---|---|---|
| Hrs. | °C. | Lbs./sq. in. |
| Start | 24 | 1,620 |
| 0.75 | 132 | 1,170 |
| 1 | 132 | [1] 1,020-1,610 |
| 1.5 | 132 | [1] 1,170-1,610 |
| 3.0 | 148 | [1] 950-1,600 |
| 3.75 | 152 | 1,340 |
| Bomb allowed to cool and stand 64 hours | | |
| | 13 | 800 |
| Agitation and heating continued | | |
| 5.25 | 190 | 1,680 |
| 7.25 | 200 | [1] 1,470-1,600 |
| 8.25 | 200 | 1,530 |
| Agitation and heating stopped. | | |

[1] Recharged with $H_2$.

About 3.37 parts (1.67 mols) of hydrogen were absorbed by the condensate. Only 3.23 parts (1.60 mols) of hydrogen were theoretically required to reduce the aldehyde group and hydrogenate the ethylenic double bonds present. Therefore, it was apparent that a substantially completely saturated product resulted. The dispersed catalyst was removed from the product by means of filtration and the product was then analyzed with the following results:

| | Initial condensate | Hydrogenated condensate |
|---|---|---|
| Combined aldehydes as crotonaldehyde percent | [1] 29 | Nil |
| OH by acetylation do | | [2] 6.8 |
| Conversion of aldehyde group do | | 99+ |

[1] Theory 34.
[2] Theory 8.0.

One hundred and seventy-five parts of the hydrogenated condensate obtained above were vacuum distilled and an analysis of each of the fractions obtained was made.

was then made in order to identify the above fractions. It is apparent from comparing the theoretical values with the actual values that fraction 2 fits the first compound below, fraction 4 approximates the second compound (assuming only part of an ether linkage split to hydroxyl), and that fraction 3 is a mixture of compounds 1 and 2. The residue from fractional distillation is probably a mixture of compounds 3, 4 and 5. The calculated and observed molecular refractions of fractions 2 are 65.9 and 65.6, respectively.

Example 2

An allo-ocimene-crotonaldehyde condensate from which the polymeric constituents formed in the condensation had been removed was hydrogenated to the extent that the aldehyde group was reduced and the ethylenic double bonds partially hydrogenated as follows. 120 parts of condensate and 0.6 part of platinum oxide were placed in an electrically heated chrome-steel pressure bomb. Hydrogen was introduced under pressure, the contents agitated while heating in accordance with the ensuing schedule:

| Time | Temp. | Pressure |
|---|---|---|
| Hrs. | °C. | Lbs. per in.² |
| Start | 20 | 1,710 |
| 4 | 126 | 2,110 |
| 6 | 215 | 1,950 |
| Bomb cooled and allowed to stand 16 hours | | |
| | 12 | [1] 1,170-1,690 |
| 14 | 128 | 2,100 |
| 16.5 | 220 | 1,980 |
| Agitation stopped and bomb cooled | | |

[1] Refilled with $H_2$.

1.75 parts (0.87 mol) of hydrogen were absorbed. Since only about 1.09 (0.54 mol) of hydrogen were theoretically required to reduce the aldehyde group to a primary alcohol group, it is apparent that, in addition to the reduction of the aldehyde group, the ethylenic double bonds were partially hydrogenated. The reaction mixture was then filtered, and analysis of the product showed the following:

|  | Initial condensate | Hydrogenated condensate |
|---|---|---|
| Aldehyde as combined crotonaldehyde percent | | Nil |
| OH by acetylation do | [1] 30 | [2] 6.8 |
| Conversion of aldehyde group do | | 97+ |

[1] Theory 34.
[2] Theory 8.

Example 3

An allo ocimene-crotonaldehyde condensate from which the polymeric constituents formed in the condensation had been removed was hydrogenated to the extent that merely the aldehyde groups thereof were reduced as follows:

162 parts of condensate and 10 parts of copper chromite catalyst were placed in an electrically heated chromium steel pressure bomb. The charge was agitated, heated and hydrogen introduced under pressure in accordance with the ensuing schedule.

| Time | Temp. | Pressure |
|---|---|---|
| Hrs. | °C. | Lbs./sq. in. |
| Start | 36 | 1,970 |
| 0.5 | 140 | 2,500 |
| 0.75 | 168 | 2,400 |
| 1.0 | 184 | 1,820 |
| 1.25 | 160 | [1] 1,610–1,990 |
| 1.5 | 172 | 1,850 |
| 1.75 | 180 | 1,760 |
| 2.0 | 180 | 1,560 |
| 2.25 | 182 | 1,420 |
| 2.5 | 182 | 1,330 |
| 2.75 | 180 | 1,260 |
| 3.0 | 176 | 1,220 |
| 3.25 | 174 | [1] 1,200–1,970 |
| 3.5 | 176 | 1,910 |
| 4.5 | 180 | 1,850 |
| 4.75 | 182 | 1,840 |
| Agitation and heating stopped. | | |

[1] Recharged bomb with $H_2$.

Hydrogen was absorbed in the amount of 1.83 parts (0.91 mol). The product was then filtered to remove dispersed catalyst. 138 parts of the filtrate were vacuum distilled at 3 to 5 mm. pressure. Most of the material distilled at a temperature of 129 to 140° C. to give a water-white liquid which analyzed.

Per cent combined aldehydes as $C_3H_5CHO$—Nil
Per cent OH by acetylation—7.3 (theory 8% for pure product)

The alcohols produced by virtue of this invention are useful in the manufacture of various esters from which can be made ester insecticides, etc., and in the manufacture of resins by esterification with mono- or polybasic acids. They may be sulfonated to produce emulsifying, wetting and sudsing agents which are used in the form of their alkali and organic base salts. The monomeric alcohols themselves possess wetting and detergent properties when emulsified in water.

It will be understood that the details and examples hereinbefore set forth are illustrative only and that the invention as broadly described and claimed is in no way limited thereby.

This application constitutes a continuation-in-part of my application for United States Letters Patent, Serial No. 372,489, filed December 31, 1940.

What I claim and desire to protect by Letters Patent is:

1. A substituted benzyl alcohol having the formula R—CH2OH in which R is a substituted phenyl radical selected from the group consisting of trimethyl-butenyl-tetrahydrophenyl and trimethyl-butylhexahydrophenyl.

2. Trimethyl butenyl tetrahydrobenzyl alcohol.

3. Trimethyl butyl hexahydrobenzyl alcohol.

4. The method of producing a primary alcohol from a condensation product of an acyclic terpene having three double bonds per molecule and crotonaldehyde, which comprises hydrogenating said condensation product in contact with an active hydrogenation catalyst.

5. The method of producing a primary alcohol from a condensation product of an acyclic terpene having three double bonds per molecule and crotonaldehyde, which comprises hydrogenating said condensation product, in contact with an active base metal hydrogenation catalyst.

6. The method of producing a primary alcohol from a condensation product of an acyclic terpene having three double bonds per molecule and crotonaldehyde, which comprises hydrogenating said condensation product, in contact with an active noble metal hydrogenation catalyst.

7. The method of producing a primary alcohol from a condensation product of an acyclic terpene having three double bonds per molecule and crotonaldehyde, which comprises hydrogenating said condensation product, in contact with an active copper chromite catalyst.

8. The method of producing a primary alcohol from a condensation product of an acyclic terpene having three double bonds per molecule and crotonaldehyde, which comprises hydrogenating said condensation product, in contact with an active hydrogenation catalyst, at a temperature within the range of from about 25° C. to about 250° C. and at a pressure within the range of from about 15 lbs./sq. in. to about 3000 lbs./sq. in.

9. The method of producing a primary alcohol from a condensation product of an acyclic terpene having three double bonds per molecule and crotonaldehyde, which comprises hydrogenating said condensation product, in contact with an active base metal hydrogenation catalyst, at a temperature within the range of from about 100° C. to about 200° C. and at a pressure within the range of from about 250 lbs. per square inch to about 3000 lbs. per square inch.

10. The method of producing a primary alcohol from a condensation product of an acyclic terpene having three double bonds per molecule and crotonaldehyde, which comprises hydrogenating said condensation product, in contact with an active noble metal hydrogenation catalyst, at a temperature of from about 25° C. to about 100° C. and at a pressure of from about 15 lbs. per square inch to about 100 lbs. per square inch.

11. The method of producing a primary alcohol from a condensation product of an acyclic terpene having three double bonds per molecule and crotonaldehyde, which comprises hydrogenating said condensation product, in contact with an active copper chromite catalyst, at a temperature of from about 100° C. to about 200° C. and at a pressure of from about 250 lbs. per square inch to about 3000 lbs. per square inch.

ALFRED L. RUMMELSBURG.